D. C. RUTH.
ROTARY PLOW.
APPLICATION FILED DEC. 28, 1909.
974,711.
Patented Nov. 1, 1910.
2 SHEETS—SHEET 2.
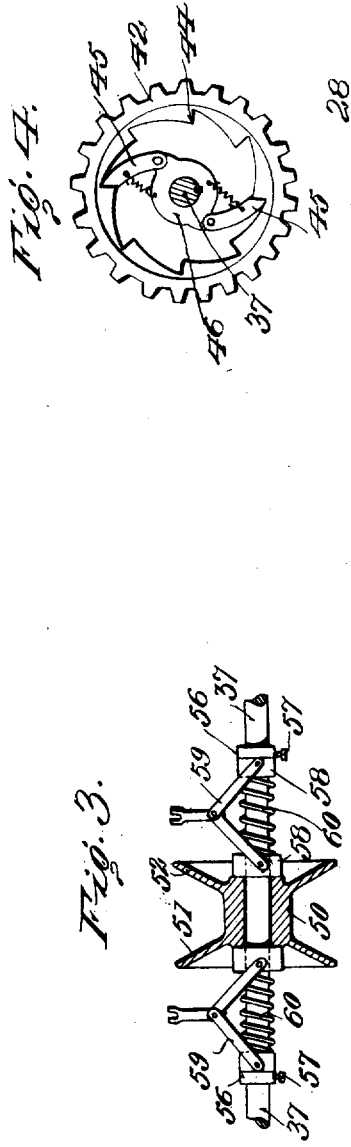
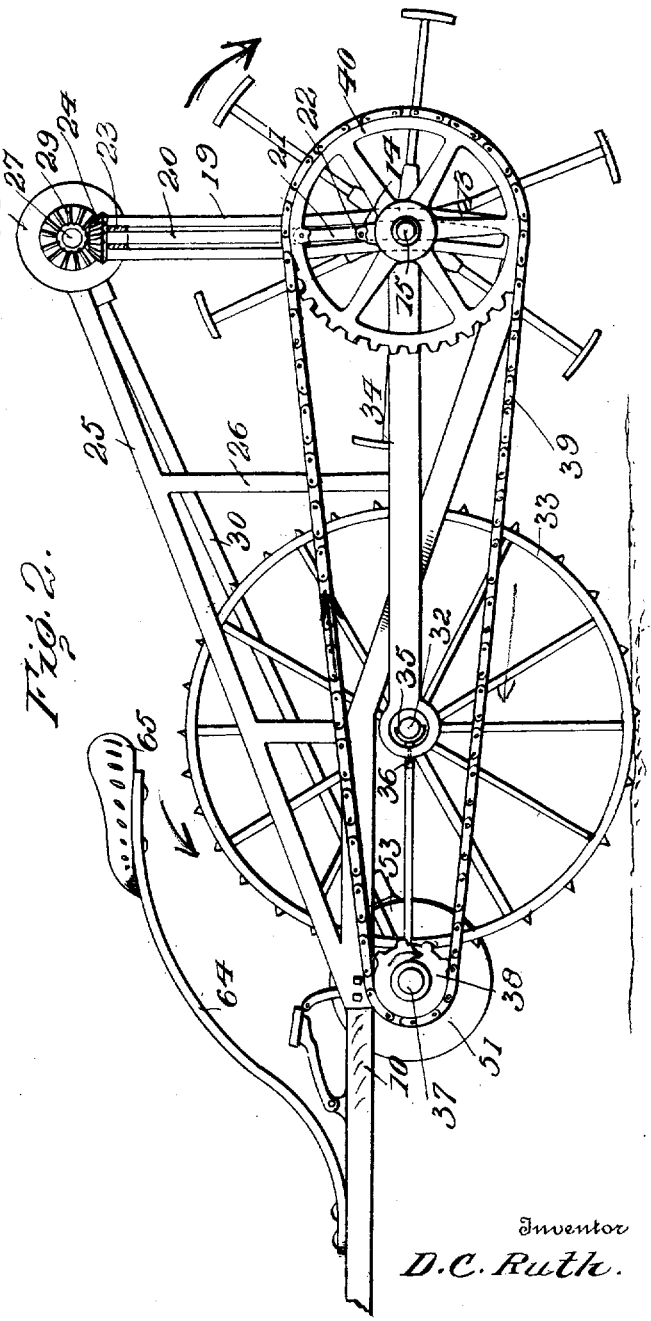
Witnesses
Inventor
D. C. Ruth.
By
Attorneys

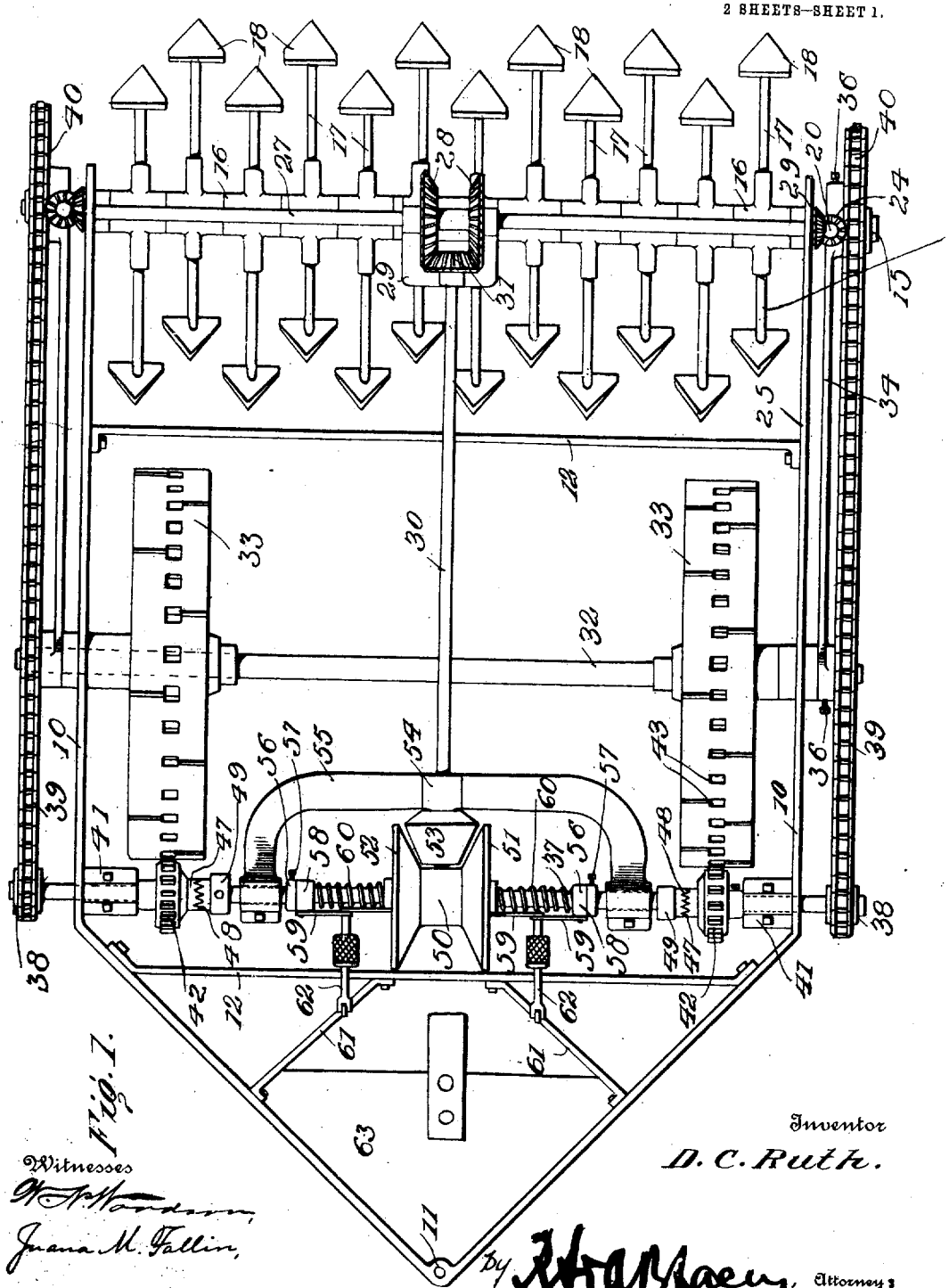

UNITED STATES PATENT OFFICE.

DAVID C. RUTH, OF HALSTEAD, KANSAS.

ROTARY PLOW.

974,711.     Specification of Letters Patent.     Patented Nov. 1, 1910.

Application filed December 28, 1909. Serial No. 535,301.

*To all whom it may concern:*

Be it known that I, DAVID C. RUTH, citizen of the United States, residing at Halstead, in the county of Harvey and State of Kansas, have invented certain new and useful Improvements in Rotary Plows, of which the following is a specification.

This invention relates broadly to agricultural implements and refers particularly to an improvement in rotary plows.

The invention has for an object the provision of a construction in a rotary plow whereby the rotary members may be vertically adjusted in order to maintain them at the desired depth.

The invention has for another object the provision of a construction of a rotary plow in which the same may be easily controlled so as to be peculiarly adaptable not only for a great range but also for small fields and to admit of turning short in either direction, and at the same time to provide a mechanism which is compact and of simple construction.

For a full understanding of the invention reference is to be had to the following description and accompanying drawings in which:—

Figure 1 is a top plan view of the complete rotary plow. Fig. 2 is a side elevation of the same. Fig. 3 is a detailed section of the clutch mechanism, and Fig. 4 is a detailed elevation of one of the ratchet pinions employed.

Corresponding and like parts are referred to in the following description and indicated in all the views of the accompanying drawings by the same reference characters.

Referring to the drawings the numeral 10 designates the frame of the plow which comprises a pair of bars which are disposed in parallel and spaced relation, and which are converged at their forward ends where they are terminated in an eye 11.

The eye 11 is adapted to receive any suitable connection for drawing the implement, as for instance, a connection to a traction engine or the like. The rear end of the frame 10 is curved downwardly and is strengthened by a cross-piece 12 which is secured against the inner faces of the bars adjacent the rear end of the same. The rear ends of the bars are provided with upwardly extended guides 13 which are of arcuate formation and in which are mounted sliding blocks 14. The blocks 14 carry the opposite ends of a transverse-shaft 15 upon which are supported in spaced relation a plurality of spider sockets 16 upon which are radially extended arms 17 which support at their outer ends the shovels 18.

It will be observed from Fig. 2 that the shovels 18 are arranged circularly about the shaft 15 and have their outer faces curved to conform to the curvature of the rotary plow. From Fig. 2 it will also be observed that the arcuate guides 13 extend but a slight distance above the lower ends of the bars which comprise the frame 10 and that the same terminate at their upper ends in vertical guides 19 between which are disposed rods 20. The rods 20 are flattened at their lower extremities and carry thereon links 21 which are depended from the ends of the rods 20 and are pivotally secured at their extremities upon lugs 22 which are projected upwardly from the sliding blocks 14. The upper ends of the rods 20 are threaded to engage through sleeves 23 which carry upon their upper ends beveled pinions 24 for the purpose of feeding the rods 20 vertically through the sleeves 23. The upper extremities of the vertical guides 19 are terminated abruptly to form bearing faces for the undersides of the pinions 24 in order to form supports for the same and to regulate the rods 20 relative thereto. The frame 10 is provided at each side with an oblique beam 25 which extends from the forward end thereof to a point adjacent the upper extremity of each of the vertical guides 19 and are supported in such relation through the medium of vertical braces 26. Within the rear ends of the beam 25 jack-shafts 27 are journaled which extend therefrom toward the center of the frame 10 and are provided thereat with oppositely beveled gears 28. The outer extremities of the jack-shafts 27 are provided with pinions 29 which mesh with the beveled pinions 24 and are adapted to impart rotation thereto. A U-shaped frame 29 is disposed upon the inner ends of the jack-shafts 27 having the arms of the same journaled thereabout and against the inner faces of the beveled gears 28, and supporting an operating shaft 30 in the cross-arm of the same. The rear extremity of the operating shaft 30 is provided with a beveled pinion 31 which meshes with the beveled gears 28 and thereby imparts rotation to the jack-shafts 27.

Intermediately of the frame 10 and at the point from which the rear end of the frame 10 is deflected an axle 32 is transversely disposed to support a pair of traction wheels 33 adjacent the opposite ends of the same and inwardly of the sides of the frame 10. The extremities of the axle 32 are extended through the side-bars of the frame 10 and support thereon the forward extremity of the links 34 which extend rearwardly therefrom and are engaged upon the opposite extremities of the transverse shaft 15 to form a rigid base for the same. It will be observed from Fig. 2 that the opposite ends of each of the links 34 are provided with bearing blocks 35 which are of semi-circular formation and adapted for engagement against the axle 32 and shaft 15 to take up lost motion, between the same and the links 34, incident to the wearing of the axle and shaft. The bearing blocks 35 are fed inwardly through the medium of feed-screws 36.

At the forward end of the frame 10 a power-shaft 37 is transversely disposed which is projected outwardly from the opposite sides of the frame and carries thereon sprockets 38 which are provided with chains 39 extended backwardly therefrom and engaged over gears 40 keyed to the opposite extremities of the transverse shaft 15. The shaft 37 is journaled in suitable bearing blocks 41 which are located at the opposite corners of the frame 10 and is provided adjacent the blocks 41 with pinions 42 loosely mounted thereon and which mesh with the traction wheels 33.

From Fig. 1 it will be observed that the traction wheels 33 are provided with equidistantly spaced openings 43 which are confined to the central portions of the peripheries thereof, and which receive the teeth of the pinions 42 to impart rotation to the pinions 42 and the shaft 37 upon the movement of the device. The pinions 42 are formed of hollow casings having the inner wall thereof formed with ratchet teeth 44 to coöperate with the pawls 45 which are oppositely disposed upon a collar 46 which is loosely mounted about the shaft 37 which passes centrally through the gear 42. This provision of the pawls 45 and the ratchet teeth 44 admit of the differential movement of the drive wheels 33 when the plow is being turned in either direction. The collars 46 are provided at their inner opposite ends with laterally extending teeth 47 which are adapted for interlocking engagement with teeth 48 which are correspondingly formed upon sliding sleeves 49 keyed to the shaft 37. It is readily observed from this construction that when it is desired to impart rotation to the shaft 37 the sleeves 49 are moved longitudinally upon the shaft 37 to intermesh the teeth 47 and 48 and to thereby lock the gears 42 upon the shaft 37.

Centrally upon the shaft 37 is a friction drum 50 which is keyed for longitudinal movement thereon and adapted for rotation therewith. The drum 50 is provided with flanges 51 and 52 at its opposite ends which are provided with outwardly tapered inner faces for coöperation with a beveled friction pinion 53 carried upon the forward extremity of the operating shaft 30. The operating shaft 30 is provided at its forward end with a bearing 54 which is mounted upon a bracket 55 to carry the forward end of the operating shaft 30 and the friction pinion 53. Equi-distantly spaced from the friction drum 50 and upon the shaft 37 are collars 56 which are adjustably secured to the shaft 37 by the provision of feed screws 57 and are adapted for rotation therewith. At each side of the drum 50 and between the same and the collar 56 are spaced sleeves 58 which are connected to each other by links 59, being pivotally connected at their free ends above the shaft 37. Helical springs 60 are disposed between the sleeves 58 for normally spacing the same. The forward end of the frame 10 is provided with supporting arms 61 which are arranged adjacent the opposite sides of the drum 50 and pivotally support upon the same the foot levers 62 which are hingedly connected to the upper ends of the links 59 and are adapted to force the same downwardly under the action of the foot of the operator.

The forward end of the frame 10 is preferably provided with a platform, which is disclosed at 63 in Fig. 2 of the drawings and upon which is mounted a seat-post 64 which is extended rearwardly from the forward end of the platform 63 and supports a suitable seat 65 at a point directly over the bracket 55. This position of the seat 65 enables the operator to press the foot-levers 62 in order to adjust the rotary plow.

In the operation of the device, when the plow is drawn forwardly, the traction wheels 33 are revolved and the gears 42 are thus rotated. The collars 49 are now moved outwardly upon the shaft 37 to intermesh with the gears 42 and to thereby lock the same with respect to the shaft 37. The shaft 37, which is thus rotated imparts such movement to the transverse shaft 15 through the medium of the chain 39 and the sprockets 38 and 40. This motion thereby revolves the shovels 18 in a direction opposite to that in which the traction wheels 33 are revolved. When it is desired to raise or lower the shaft 15 the operator depresses one of the foot pedals 62, whereby the links 59 are forced downwardly and diverged at their lower ends to operate the sleeves 58. As the adjacent collar 56 is rigid upon the shaft 37 the inner sleeve 58 only is moved to force the drum 50 longitudinally upon the shaft 37 and to engage the flange 52 against the pinion 53 to thus set the shaft 30 in operation. The motion of the shaft 30 is imparted to the jack-shafts 27 through the medium of gears 28 and the pinion 31, whereupon the beveled pinions 24 and 29 are operated to rotate the sleeves 23 and to thus feed the rods 20 longitudinally through the vertical guides 29. As the rods 20 are connected to the sliding blocks 14 through the medium of the links 21, the blocks 14 are moved longitudinally within the arcuate guides 13, and are thus caused to raise and lower the shaft 15 carrying therewith the arms 17 and the shovels 18.

Having thus described the invention what is claimed as new is:—

1. A rotary plow including a frame, guides formed at the rear end of said frame, blocks mounted in said guides, a rotary cultivator carried by said blocks, a power-shaft carried by the frame and connected to said cultivator to rotate the same, rods carried by said frame above said guides, a transmission disposed between said power-shaft and said rods for vertically reciprocating said rods, and links connecting said rods and blocks.

2. A rotary plow including a frame, a transverse shaft located in the rear end of said frame and adapted for vertical movement therein, a power-shaft connected to said transverse shaft for rotating the same, a drum having oppositely beveled faces carried upon said power-shaft, an operating shaft mounted in the frame and connected to said transverse shaft to vertically adjust the same, and a pinion carried by said operating shaft for alternate engagement with the bearing faces of said drum.

3. A rotary plow including a frame, guides arranged at the rear end of said frame, blocks mounted in said guides, a rotary cultivator carried by said blocks, rods extending upwardly from said blocks and provided with threads, sleeves arranged in threaded relation about the upper ends of said rods, an operating shaft longitudinally positioned in said frame, gears disposed between said operating shaft and said sleeves for rotating the same, a bevel pinion located upon the forward end of said operating shaft, a power shaft carried by said frame and connected to said rotary cultivators for actuating the same, and a drum having oppositely beveled bearing faces and slidably disposed upon said power-shaft to alternately engage the opposite sides of said pinion.

4. In a rotary plow the combination with a frame, a rotary cultivator mounted therein, and means for rotating said cultivator, of a drum mounted in said frame and adapted for lateral movement therein, an operating shaft mounted in said frame, a bevel pinion carried by said operating shaft for engagement with said drum, and means connected to the rear end of said operating shaft for adjusting said rotary cultivator.

5. A rotary plow including a frame, a rotary cultivator mounted in said frame, rods disposed in the frame and connected to said rotary cultivator, shafts having gears connected to said rods for vertically reciprocating the same, a pinion carried by one of said shafts, a drum having inner opposite faces for alternate engagement with said pinion, and means carried by the frame and connected to said drum for actuating the same to alternately engage the opposite sides of said pinion.

In testimony whereof I affix my signature in presence of two witnesses.

DAVID C. RUTH. [L. S.]

Witnesses:
J. H. McNair,
Lucas P. Krehbiel.